US010838748B2

(12) United States Patent
Liskin et al.

(10) Patent No.: US 10,838,748 B2
(45) Date of Patent: Nov. 17, 2020

(54) SYSTEM AND METHOD OF EMULATING EXECUTION OF FILES BASED ON EMULATION TIME (71) Applicant: AO Kaspersky Lab, Moscow (RU)

(72) Inventors: Alexander V. Liskin, Moscow (RU); Vladimir V. Krylov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 16/558,491

(22) Filed: Sep. 3, 2019

(65) Prior Publication Data
US 2019/0391830 A1 Dec. 26, 2019

Related U.S. Application Data (63) Continuation of application No. 15/730,958, filed on Oct. 12, 2017, now Pat. No. 10,437,618.

(30) Foreign Application Priority Data

Aug. 17, 2017 (RU) ................................ 2017129267

(51) Int. Cl.
G06F 9/455 (2018.01)
G06F 9/445 (2018.01)
(Continued)

(52) U.S. Cl.
CPC .............. G06F 9/455 (2013.01); G06F 9/445 (2013.01); G06F 11/3636 (2013.01);
(Continued)

(58) Field of Classification Search
None
See application file for complete search history.

(56) References Cited

U.S. PATENT DOCUMENTS 5,574,927 A * 11/1996 Scantlin .............. G06F 9/30036
703/23
6,145,103 A * 11/2000 Typaldos ............ G06F 11/3648
703/28

(Continued)

FOREIGN PATENT DOCUMENTS

JP 2003108388 A 4/2003
JP 2008521111 A 6/2008
WO 2004075060 A1 9/2004

OTHER PUBLICATIONS

Kazuki Iwamoto, 1 outside, "Investigation and Results of Malware Classification by Static Analysis", Multimedia, Distributed, Cooperative and Mobile (DICOMO 2010) Symposium Papers, The Information Processing Society of Japan, Jun. 30, 2010 2010 volume, No. 1, pp. 477-491.

(Continued)

Primary Examiner — Eric Coleman
(74) Attorney, Agent, or Firm — Arent Fox LLP; Michael Fainberg (57) ABSTRACT Disclosed are systems and methods for emulating execution of a file based on emulation time. In one aspect, an exemplary method comprises, generating an image of a file, emulating an execution of instructions from the image for a predetermined emulation time, the emulation including: when an emulation of an execution of instruction from an image of another file is needed, generating an image of the another file, detecting known set of instructions in portions read from the image, inserting a break point into a position in the generated image corresponding to a start of the detected set of instructions, emulating execution of the another file by emulating execution of instructions from the generated image, and adding corresponding records to an emulation log, and reading a next portion from the image of (Continued)

the another file and repeating the emulation until the predetermined emulation time has elapsed.

21 Claims, 4 Drawing Sheets

(51) Int. Cl.
    *G06F 11/36*     (2006.01)
    *G06F 21/56*     (2013.01)

(52) U.S. Cl.
    CPC ........ *G06F 21/566* (2013.01); *G06F 11/3688* (2013.01); *G06F 2221/033* (2013.01)

(56) References Cited

U.S. PATENT DOCUMENTS

| | | | |
|---|---|---|---|
| 6,564,179 B1 * | 5/2003 | Belhaj | G06F 9/45504 703/24 |
| 7,162,410 B1 * | 1/2007 | Nemecek | G06F 11/3652 703/27 |
| 7,168,067 B2 * | 1/2007 | Betker | G06F 11/362 714/E11.209 |
| 8,365,297 B1 * | 1/2013 | Parshin | G06F 21/53 726/26 |
| 9,038,184 B1 | 5/2015 | Mann | |
| 9,501,643 B1 | 11/2016 | Zakorzhevsky et al. | |
| 9,946,624 B1 | 4/2018 | Kfir | |
| 2002/0184613 A1 | 12/2002 | Kuzemchak | |
| 2004/0040013 A1 * | 2/2004 | Kalra | G06F 11/362 717/129 |
| 2004/0250150 A1 | 12/2004 | Swoboda | |
| 2005/0027971 A1 | 2/2005 | Williams | |
| 2006/0010101 A1 | 1/2006 | Suzuki | |
| 2010/0092178 A1 | 4/2010 | Liu et al. | |
| 2013/0132063 A1 | 5/2013 | Rieschl | |
| 2013/0326489 A1 | 12/2013 | Eijndhoven | |
| 2014/0095832 A1 | 4/2014 | Haber | |
| 2015/0121531 A1 | 4/2015 | Pintiysky | |
| 2016/0048466 A1 | 2/2016 | Rajan | |
| 2016/0321156 A1 | 11/2016 | Zhang et al. | |
| 2016/0378977 A1 | 12/2016 | Alme | |
| 2017/0255728 A1 | 9/2017 | Wakefield | |

OTHER PUBLICATIONS

Japanese Office Action with English translation for 2017-201842 dated Jan. 4, 2019.

* cited by examiner

SYSTEM AND METHOD OF EMULATING EXECUTION OF FILES BASED ON EMULATION TIME

CROSS-REFERENCE TO RELATED APPLICATIONS

This application is a continuation of U.S. patent application Ser. No. 15/730,958, filed on Oct. 12, 2017, which claims the benefit of priority under 35 U.S.C. 119(a)-(d) to a Russian Application No. 2017129267 filed on Aug. 17, 2017, which are incorporated by reference herein in their entirety.

FIELD OF TECHNOLOGY

The present disclosure relates generally to the field of emulation of the execution of files, specifically to a system and methods of emulating the execution of files.

BACKGROUND

At present there is a broad variety of means for the development of executable files. Often during the development of software, especially when creating executable files, instructions different from machine instructions are placed in those files, such as instructions in the form of intermediate code (such as Common Intermediate Language, or CIL, instructions) or scripts.

When emulating the execution of files (such as Portable Executable, or PE, files) it is important to form as complete a log of function calls as possible. The completeness of such a log influences in particular the quality of detection of malicious files (such as the detection rate) when emulating their execution. When the executable file uses data or function types from dynamic libraries, the emulator carries out a number of steps of the operating system (OS) loader. For example, for executable files for the Windows OS, the emulator performs changes in the IAT (Import Address Table) section of the image of the executable file, relating to the fixing of the addresses of functions which need to be called during the execution of the file (and, accordingly, also during emulation of the execution). The emulator saves the information entered into the IAT as to the correspondence between the addresses of the functions and their names. Thus, when a certain function is called during the emulation of the execution of a file, the emulator determines that a certain library function has been called and changes the function call log appropriately.

But while emulating the execution of files which contain instructions different from machine instructions, no information at all is saved in the IAT on functions formalized in a way different from machine instructions, so that the problem arises of logging (recording the function calls in a log) of instructions, including also functions, formalized in a way different from machine instructions.

SUMMARY

Thus, a system and method is disclosed herein for emulating the execution of files based on emulation time, and, more particularly, for systems and methods for emulating execution of files containing instructions different from machine instructions based on emulation time.

In one aspect, a method for emulating execution of a file based on emulation time is provided. The method includes generating an image of a file, emulating an execution of instructions from the image of the file for a predetermined emulation time, wherein the emulation includes: when an emulation of an execution of instruction from an image of another file is needed, generating an image of the another file, detecting at least one known set of instructions in a portion read from the image of the another file, inserting a break point into a position in the generated image of the another file corresponding to a start of the detected at least one known set of instructions from the image of the another file, emulating execution of the another file by emulating execution of instructions from the generated image of the another file, and adding corresponding records to an emulation log associated with the emulated execution of the at least one known set of instructions from the image of the another file, and reading a next portion from the image of the another file and repeating the emulation of the execution of instructions until the predetermined emulation time has elapsed.

In one aspect, the generating of the image further comprises reading a portion of the image of the file, and the method further comprises: detecting at least one known set of instructions in the read portion of the image of the file, and inserting break points in the generated image of the image of the file, each break point corresponding to a respective detected known set of instructions.

In one aspect, the method further comprises emulating an execution of the at least one known set of instructions from the image of the file, and adding, to the emulation log, records corresponding to the emulation of the execution of the at least one known set of instructions from the image of the file.

In one aspect, the image of the file is generated by imitating functions of a loader of an operating system of a computing device.

In one aspect, the image of the file includes at least one of: instructions of program code contained in the file, service information on entry points of the program code, a content of an import address table, and locations of sections of the file.

In one aspect, the service information on entry points of the program code, the content of the import address table, and the locations of sections of the file are obtained from a header of the file.

In one aspect, a size of the portion read from the image is selected from: 4 kb, and a size equal to a size of a cluster on a data storage device.

A system for emulating execution of files based on emulation time, the system comprising: a storage device configured to store a file, an image of a file, and an emulation log, and In one aspect, a system is provided for emulating execution of files based on emulation time, the system comprising: a storage device configured to store a file, an image of a file, and an emulation log, and a hardware processor configured to: generate an image of a file, and emulate an execution of instructions from the image of the file for a predetermined emulation time, wherein the configuration for the emulation includes a configuration for: when an emulation of an execution of instruction from an image of another file is needed, generating an image of the another file, detecting at least one known set of instructions in a portion read from the image of the another file, inserting a break point into a position in the generated image of the another file corresponding to a start of the detected at least one known set of instructions from the image of the another file, emulating execution of the another file by emulating execution of instructions from the generated image of the another file, and adding corresponding records to an emulation log associated with the emulated execution of the at least one known set of instructions from the image of the another file, and reading a next portion from the image of the another file and repeating the emulation of the execution of instructions until the predetermined emulation time has elapsed.

In one aspect, a non-transitory computer-readable medium is provided comprising computer executable instructions for emulating an execution of a file based on emulation time, including instructions for generating an image of a file, emulating an execution of instructions from the image of the file for a predetermined emulation time, wherein the emulation includes: when an emulation of an execution of instruction from an image of another file is needed, generating an image of the another file, detecting at least one known set of instructions in a portion read from the image of the another file, inserting a break point into a position in the generated image of the another file corresponding to a start of the detected at least one known set of instructions from the image of the another file, emulating execution of the another file by emulating execution of instructions from the generated image of the another file, and adding corresponding records to an emulation log associated with the emulated execution of the at least one known set of instructions from the image of the another file, and reading a next portion from the image of the another file and repeating the emulation of the execution of instructions until the predetermined emulation time has elapsed.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for emulating the execution of files based on emulation time. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure shall introduce a number of terms will be used in the description of variant aspects of the present disclosure.

Emulation is the imitation of the functioning of one device by means of another device or devices of a computer, wherein the imitating device receives the same data, executes the same program, and achieves the same result as the imitated device.

Emulating the execution of a file is the imitation of the execution of a file on one device by means of another device or devices of a computer.

Emulating the execution of an instruction is the imitation of the execution of an instruction on one device by means of another device or devices of a computer. By instruction is meant an instruction of executable code which, in particular, may be contained in the executable file, as well as in the form of an executable file.

The image of a file is a representation of a file in the course of emulating its execution, specifically, the set of data describing the file at least with a completeness necessary for its execution (as well as the emulating of its execution). When emulating the execution of a file, the emulator (hardware or software) emulates the execution of instructions of the image of this file. The file instructions may be formalized in different ways: both in the form of machine instructions and in the form of intermediate code, e.g., Microsoft Intermediate Language (MSIL) or P-Code (portable code) instructions, or scripts, such instructions being machine instructions, intermediate code instructions, and script instructions, respectively.

By the means of the system for emulating the execution of files in the present disclosure is meant actual devices, systems, components, groups of components realized with the use of hardware, such as integrated microcircuits (application-specific integrated circuit, ASIC) or a programmable gate array (field-programmable gate array, FPGA) or, for example, in the form of a combination of software and hardware, such as a microprocessor system and a set of software instructions, as well as neuromorphic chips (neurosynaptic chips). The functionality of such means of the system can be realized exclusively by hardware, and also in the form of a combination, where some of the functionality of the means of the system is realized by software, and some by hardware. In some aspects, some of the means or all of the means may be implemented on the processor of a general-purpose computer (such as is described in FIG. 3). The system components may be realized in the confines of a single computing device or distributed among several interconnected computing devices.

Figure 1:
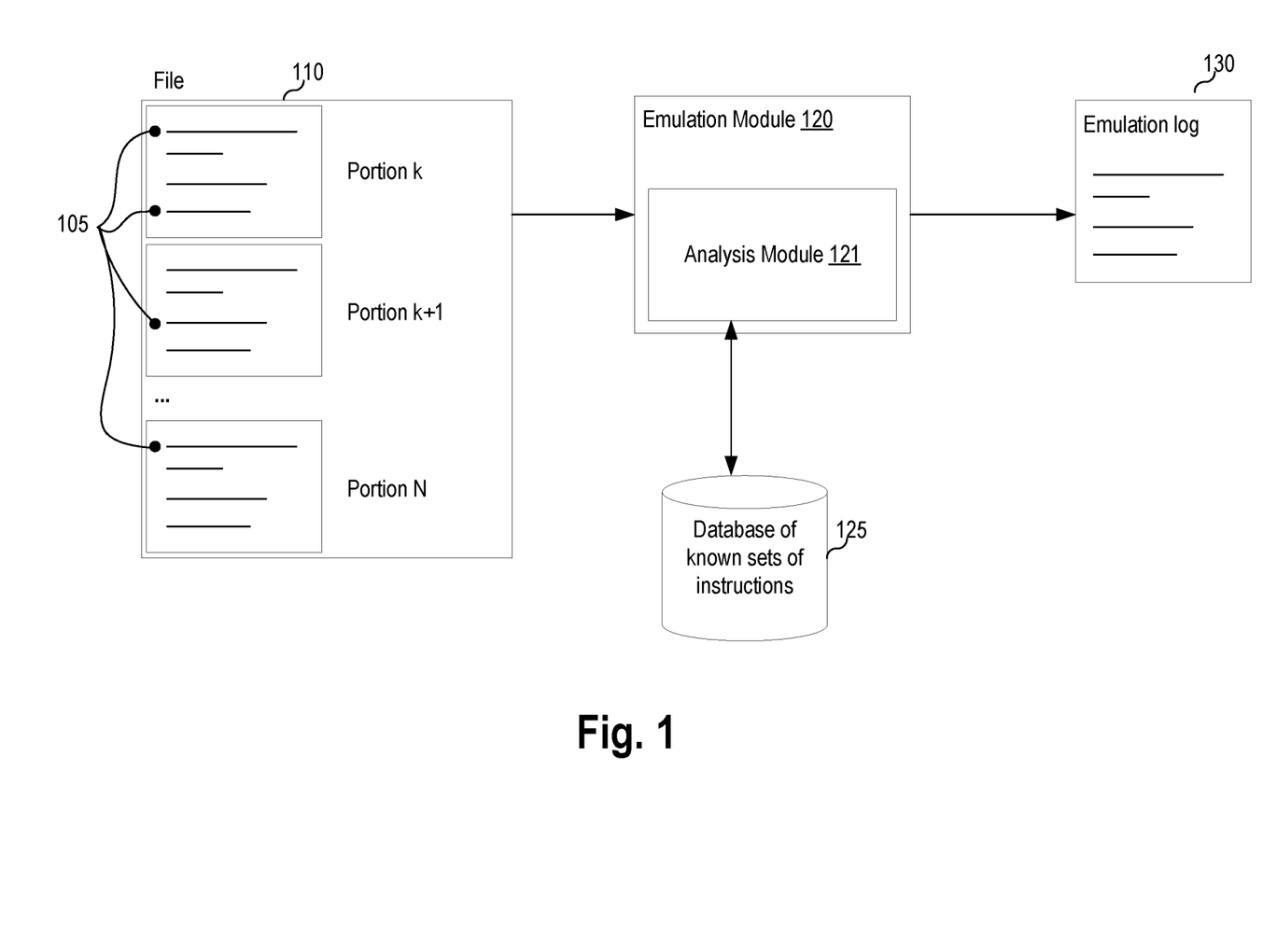
FIG. 1 is a block diagram illustrating a system for emulating the execution of files according to an exemplary aspect.

FIG. 1 is a block diagram illustrating a system 100 for emulating the execution of files according to an exemplary aspect. The system 100 includes an emulation module 120, an analysis module 121, an emulation log 130, and a database 125 configured to store known sets of instructions and/or known functions. The emulation module 120 is communicatively connected to the analysis module 121 and the emulation log 130. The analysis module 121 is communicatively connected to the database 125 of known sets of instructions. In one aspect, the analysis module 121 is part of the emulation module 120.

The emulation module 120 is configured to emulate the execution of a file 110. In the general case, the file 110 is a file containing instructions. In one aspect, this file is an executable file of PE (portable executable) format, and the instructions contained in the file are machine instructions, which can be executed by a processor of the family x86, x86-64 or any other processor able to execute instructions for the processors of those families. In yet another aspect, the file 110 may contain instructions of other types, and also instructions of different types (for example, machine instructions and intermediate code instructions or scripts, also sometimes called scenarios). During the emulation of the execution of the file 110, the emulation module 120 may form one or more emulation log(s) 130, in which records of which known sets of instructions were emulated during the execution (for example, instructions of any given WinAPI functions) are placed. These records may be placed in the emulation log 130 either before the start of the emulation of the execution of the corresponding set of instructions or after the emulation of the execution.

The file 110 may be any file saved on a data storage device. In one aspect, this file 110 is saved on a data storage device of a computing device (such as a computer), on which also reside the components of the system for emulating the execution of files. In one aspect, this file 110 may be a file for which an antivirus scan is being performed with the use of heuristic rules which are applied to the results of the emulating of the execution of the file 110, especially to the emulation log 130. From the results of such an antivirus scan, the file 110 may be found to be malicious and be removed from the data storage device or placed in quarantine. Thus, yet another technical result may be accomplished—the enforcement of security of the computing device on whose data storage device the file 110 is being kept.

In order to carry out the emulation of the execution of a file 110 (as was noted before, this is the imitation of the execution of the file 110 on one device, such as an computing device, by means of another device—the emulation module 120), the emulation module 120 forms an image of the file 110. The file image is a representation of the file which is used by the emulation module 120 during the emulating of the execution of the file 110.

In one aspect, the image of the file 110 is a set of data (which can be represented in the form of one or more data structures) containing information used for the emulating of its execution. The information used for the emulating of the execution of the file 110 includes service information, as well as instructions of the file 110 (instructions of the program code contained in the file 110). An example of service information is information on the entry point (such as its relative virtual address, or RVA) and other data from the header of the file 110, the content of the IAT (import address table), information on the location of the sections of the file 110, and others. In one aspect, the service information is also a set of instructions (bounded either by the number of instructions, such as 100, or by the cumulative volume of bytes, such as one equal to the size of the portion of the file 110) starting from the entry point. In one aspect, in order to form the image of the file 110, the emulation module 120 imitates the functions of the loader of the operating system (OS) when creating the process in the OS. In this case, the image of the file 110 which is formed is a representation of the file 110 similar to the representation in the address space of the process which would be created from this file 110 by the means of the OS.

In order to form the image of the file 110, the emulation module 120 reads the service information from the file 110. The forming of the image of the file 110 also includes a step of reading from the file 110 and adding to the image of the file 110 the instructions of the file 110. In one aspect, the emulation module 120 may read instructions from the file 110 and add them to the image of the file 110 in portions 105, which may be of fixed size. In one aspect, the size of the portion 105 is chosen such as to read all the instructions of the file 110 at one time. In yet another aspect, the instructions of the file 110 are read by portions 105 several times as needed. In one aspect, the need to read the next portion 105 of the file 110 occurs when the emulation module 120 during the emulating of the execution of the instructions (from the image of the file 110 or the image of another file) accesses instructions or data absent from the image of the file 110 (that is, those instructions not yet read from the file 110), for example, as a result of executing a conditional branch instruction. In one aspect, the size of such a portion 105 is 4 kb. In yet another aspect, the size of such a portion 105 is taken equal to the size of the cluster on the data storage device on which the file 110 is being kept. It should be noted that the emulating of the execution of instructions from the image of a file (already present in the image) 110 is possible even in the absence from the image of the file 110 of instructions not yet read (instructions present in not yet read portions of the file 110). In one aspect, the first (and possibly the only) portion of the file 110 which contains the instructions of the file 110 and is read from the file 110 is the portion of the file 110 containing an instruction indicated by the file entry point.

After reading the portion of the file 110 by the emulation module 120, the analysis module 121 detects known sets of instructions in the read portion of the file 110. In the search for known sets of instructions, the analysis module 121 utilizes signatures (at least one) which are kept in a database 125 of known functions. Accordingly, in one aspect, each known set of instructions corresponds to at least one signature. In one aspect, the database 125 is part of the analysis module 121. The signature may indicate the start of a certain known set of instructions. In one aspect, the signature may have the form of a series of bytes, a hash sum, or a bit/byte or any other mask. In yet another aspect, the signature may include a heuristic rule, the application of which to the set of instructions (or some of the instructions) of the file 110 makes it possible to detect a known set of instructions. The analysis module 121 uses the signatures from the database 125 of known sets of functions and with their help detects the start of known sets of instructions.

One example of known sets of instructions include the subprograms of static libraries. In one aspect, the static libraries are libraries of the development environment (libraries making up the development environment) of the file, for example, in Delphi language. Another example of known sets of instructions may include an instruction set of an interpreter file (for example, a library of an interpreter) configured to process (interpret) the instructions of scripts or intermediate code instructions. In some aspects, the interpreter file is a library whose instructions (e.g., subprograms) are used to execute (interpret) instructions of the file 110 different from machine instructions (for example, if the file 110 contains script or intermediate code instructions). In yet another example, the analysis module 121 may detect a known set of instructions impeding the emulating of the execution of the file, i.e., an anti-emulation set of instructions. For instance, such anti-emulation instructions include instructions whose execution performs a verification of the realization of certain WinAPI functions by the emulation module 120 and finishes the emulating of the execution of the file 110 if such functions have not been realized, or increases the time of emulation of the execution of the file 110.

A signature of a known set of instructions may also contain an identifier, such as a symbolic name (for example, "string comparison") or a check sum which is added to the record on the emulating of the execution of the known set of instructions which is formed during the emulating by the emulation module 120 and sent afterwards to the emulation log 130.

After detection of known sets of instructions by the analysis module 121 in the read portion of the file 110, the analysis module 121 sets in the corresponding image of the file 110 break points at the start of the known sets of instructions in the image of the file 110. The break points are set at places in the image of the file 110 which are placed in the mentioned image by reading the aforementioned portion of the file 110. Break points are used by the emulation module 120 to determine the time of formation of the record on the emulation of the execution of a known set of instructions and the placing of this record in the emulation log 130.

The emulation module 120 performs the emulating of the execution of the instructions from the image of the file 110. As mentioned above, in the process of the emulation, the execution of the instructions is imitated; in particular, the execution of the instructions on an actual processor (physical processor) is imitated. In the course of the emulation, the emulation module 120 generates the emulation log 130.

In one aspect, the emulation module 120 adds, to the emulation log 130, records on the calling of subprograms and instructions (in other words, executable code) which are contained in dynamic libraries (for example, those which are loaded into the address space of the process launched from the file 110 when executing the file 110 on an actual computing device). In one aspect, such records are added to the emulation log 130 when emulating the execution of a subprogram call instruction (for example, this is a call instruction in assembler language), where the address at which the instructions of the subprogram are supposed to be located is the address for one of the IAT records. Accordingly, there is added to the emulation log 130 a record on the emulation of the known set of instructions—a subprogram—as referenced by the record from the IAT. In one aspect, this record further includes the identifier of the known set of instructions, such as its symbolic name, such as fwrite, GetProcAddress, or others.

In yet another aspect of the present disclosure, the emulation module 120 may add, to the emulation log 130, a record on the emulating of the execution of the known set of instructions if, in the process of emulating the execution of instructions from the image of the file 110, the emulation module 120 reaches a break point. The emulation module 120 imitates the transfer of control from a particular instruction to an instruction in which a break point is set. As mentioned earlier, the break point is set in the image of the file 110 at the start of the known set of instructions by the analysis module 121 upon detecting this known set of instructions with the help of a signature from the database 125.

If in the process of emulation by the emulation module 120 it becomes necessary to read the next portion 105 of the file 110, the reading of this portion 105 from the file 110 is done and the steps described above are repeated (for example, the detection of known sets of instructions and setting break points), and the image of the file 110 is refreshed by the emulation module 120 by adding to it the read portion 105 of the file 110. After this, the process of emulating the execution of the instructions of the file 110 continues with the scenario described above.

In one aspect, when the emulation module 120 reaches a certain break point set at the start of a known set of instructions, the emulation module 120 adds the corresponding record to the emulation log 130, but no emulation is done for the execution of this known set of instructions (i.e., the emulation module refrains from emulating the execution). Instead, the emulation module 120 emulates the execution of another, alternative set of instructions. In one aspect, the database 125 may contain an alternative set of instructions for every known set of instructions.

In one aspect, the alternative set of instructions which corresponds to a certain known set of instructions is an optimized set of instructions: the result of emulating the execution (for example, the change in state of the device being imitated—RAM, ROM, or the value of the registers of the processor) of that set of instructions will be the same as when emulating the execution of the known set of instructions, but the emulating of the execution of that alternative set of instructions will use less requires, e.g., take less time or require a smaller volume of RAM or processor registers. The emulating of the execution of such a set of instructions in place of the known set of instructions will make it possible to speed up the process of emulating the execution of the file 110 and shorten the time for the emulating of the execution of the file 110.

In yet another aspect, the alternative set of instructions corresponding to a certain known set of anti-emulation instructions is a set of instructions which does not impede the emulating of the execution of the file (as compared to the known set): the result of the emulating of the execution (for example, the change in state of the device being imitated—RAM, ROM, or the value of the registers of the processor) of this set of instructions will be the same as in the emulating of the execution of the known set of instructions, however there will be no emulating of the set of anti-emulation instructions (which might impede the emulating of the execution of the file 110). The emulation of the execution of this set of instructions in place of the known set of instructions (which in a given case impedes the emulating of the execution of the file 110) will allow in certain cases (when the known set of instructions contains instructions impeding emulation) a speeding up of the process of emulating the execution of the file 110 and a shortening of the time for emulating the execution of the file 110. In some instances, this approach will enable the formation of an emulation log 130 which is reliable in terms of completeness of information: the log 130 formed in this way will contain more records on the emulating of the execution of known sets of instructions, since the emulating of the execution of the instructions of the file 110 will not be prevented by the known sets of instructions which impede emulation.

In one aspect, the data kept in the database 125 is placed in the database 125 by an expert, especially an expert in the field of computer technology. In one aspect, such data may be sent via a network, such as the Internet, from a server (e.g., third-party server) to the analysis module 121, which will save the data received in the database 125.

In one aspect, the emulation module 120 can additionally generate images of other files (by performing the same steps as those taken for the file 110). In some aspects, such files are the files needed for emulating the execution of the instructions of the file 110—for example, the files of dynamic libraries which can be used during the execution (and accordingly the emulating of the execution) of the instructions of the file 110. The files of dynamic libraries may include the files of libraries of the interpreters of the instructions of the file 110, if the file 110 contains not only machine instructions, but also instructions of another kind (such as instructions in the form of a script; such a file shall be called a file containing instructions different from machine instructions). The instructions of such files of libraries (and accordingly the separate sets of instructions) of interpreters are used for interpreting instructions different from machine instructions. The emulation module 120 emulates the execution of the instructions from the images of the other files, if a transfer of control (an emulation of the transfer of control) has occurred from an instruction of the image of the file 110 to an instruction in the image of the other file. For example, a transfer of control may occur by calling a subprogram whose instructions are present in the image of the other file, for example, by emulating the execution of a call or jmp instruction. It should be noted that, formally, the transfer of control will be implemented only after the image of the other file has been formed. In one aspect, the process of emulation of the execution of instructions from the image of the file 110 includes the emulation of the execution of instructions from the image of the other file, and accordingly when emulating the execution of the instructions from the image of the other file records as to the emulation of known sets of instructions contained in the image of the other file will also be added to the emulation log 130.

It should be noted that the additional formation of images of files is done only when necessary, for example, when during the emulating of the execution of the file 110 it is necessary to read data from another file or emulate the execution of instructions from the image of the other file, for example, when emulating the execution of an instruction (present in the image of the file 110) to call a subprogram, a branch instruction (such as an unconditional jump), or other circumstances of the transfer of control to instructions from the image of the other file. The process of formation of images of such files is similar to that described above. Therefore, all the steps of the method in the context of the present disclosure invention may be applied not only to the file 110, but also to the other files needed for the emulation of the file 110.

In one aspect, the file needed for the emulation of the execution of the instructions of the file 110 is a library file of the interpreter of instructions of the file 110. An example of such a library file is a module for Microsoft Visual Basic virtual machines, the file msvbvm60.dll. As an example, we may give the following known set of instructions (supplemented by code in the assembler language and by the names of certain memory addresses) of this file msvbvm60.dll from the instructions for the realization (in other words, intended for processing—or interpretation—of instructions other than machine instructions) of the intermediate P-code subprogram, namely LitStr:

| | |
|---|---|
| E8 6C 9F F2 FF | (call _vbaStrVarCopy(x)) |
| 50 | push eax |
| 33 C0 | xor eax, eax |
| 8A 06 | mov al, [esi] |
| 46 | inc esi |
| FF 24 85 58 FA 4D 73 | jmp ds:VM_Table[eax*4] |

Moreover, for this known set of instructions, the database 125 will keep its identifier "push <constant string>", which means that when it is executed (and accordingly when its execution is emulated) a pointer to the string will be placed in the stack. When emulating the execution of this set of instructions, the emulation module 120 will add to the emulation log 130 a corresponding record indicating the identifier of the known set of instructions. It should be noted that when emulating the execution of a certain known set of instructions, the emulation module 120 may also add other information to the records which are placed in the emulation log as to the course of the emulation: the contents of the registers being imitated, the arguments of the subprograms called, and so on. With the help of the above-described method, the technical problem is solved: the formation of an emulation log for files which contain instructions in a form other than that of machine instructions (in other words, different from machine instructions), such as instructions in the form of scripts or in the form of intermediate code. Such an emulation method makes it possible to achieve the technical result in the form of an emulation of the execution of a file which contains instructions in a form different from the form of machine instructions, by emulating the execution of interpreter library files.

In one aspect, setting the break points for the images of interpreter library files is done one time (since the set of instructions of such files is generally unchanged), and then information on the set break points is kept in the analysis module 121 and used to detect known sets of instructions without using the signatures of the known sets of instructions.

The emulation module 120 may be configured to halt the process of emulation of the execution of the file 110. In one aspect, the emulation module may halt the process of emulation upon expiration of an established emulation time, such as 10 seconds. In yet aspect, the emulation module may halt the process of emulation in response to emulating the execution of an instruction for an interrupt call or an execution completion function.

Figure 2A:
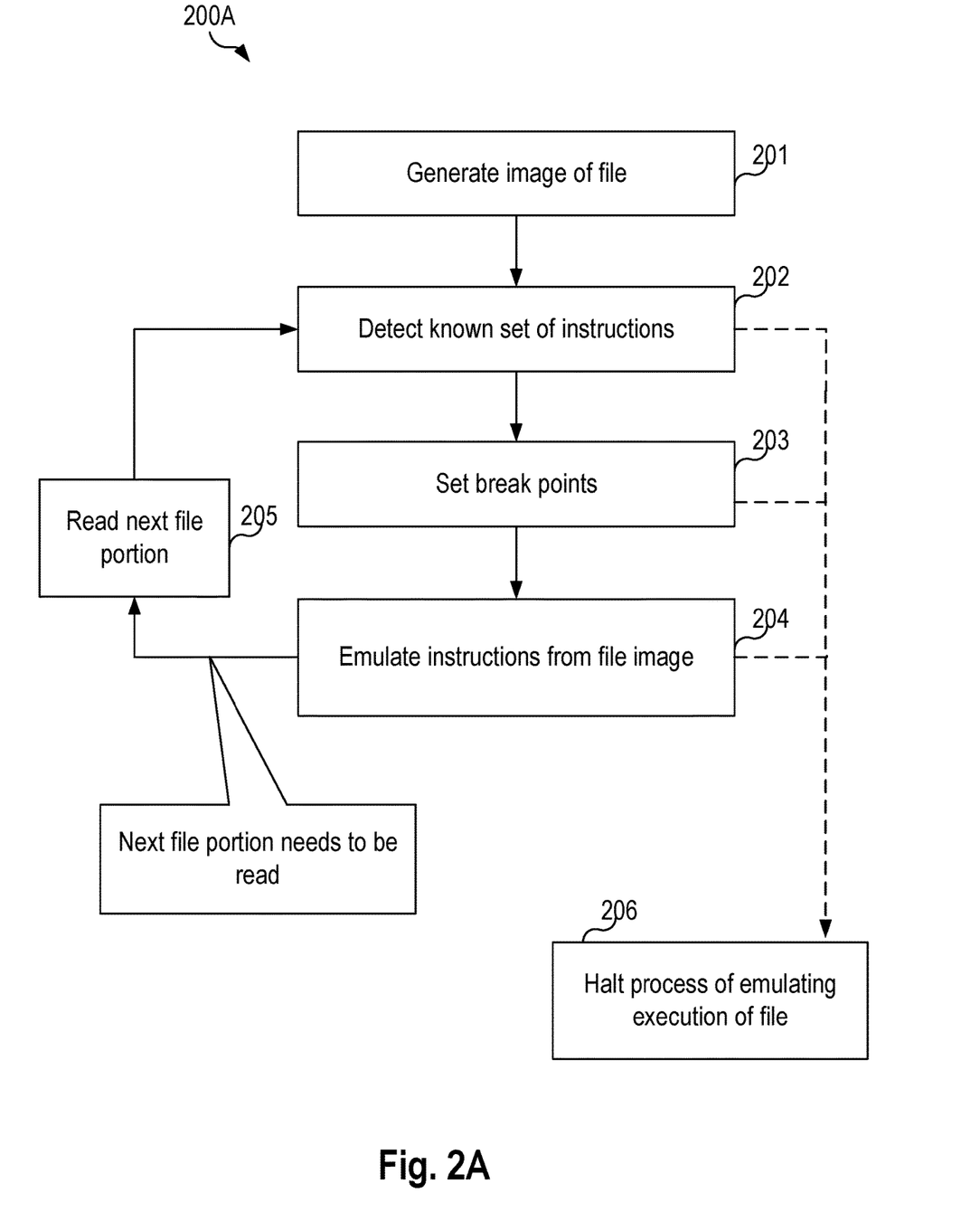
FIG. 2A is a flowchart illustrating a method for emulating the execution of files according to an exemplary aspect.

FIG. 2A is a flowchart illustrating a method 200A for emulating the execution of files according to an exemplary aspect. In step 201, the emulation module forms the image of the file 110. This step also includes the reading of the portion 105 of the file 110. As such, the emulation module generates an image of a file comprised of instructions read from the file. In some aspects, the image of the file includes instructions of program code contained in the file and service information on entry points of the program code. In some aspects, the emulation module 120 may generate an image of a library file of an interpreter of instructions of the file.

Next, in step 202, the analysis module 121 detects at least one known set of instructions in the portion 105 of the file 110 read by the emulation module 120. The detection may be done with the aid of signatures from a database 125 of known sets of instructions. In one aspect, the detected at least one known set of instructions may be instructions having corresponding optimized instructions. In another aspect, the detected at least one known set of instructions may include anti-emulation instructions configured to impede emulation of execution of the file. In some aspects, the detected at least one known set of instructions may include an instruction set of an interpreter library configured to process instructions of the file different from machine instructions. In step 203 the analysis module 121 sets break points in the formed image of the file 110 at places (positions) corresponding to the starts of all the detected known sets of instructions from the read portion 105 of the file 110.

After this, in step 204, the emulation module 120 performs the emulation of the execution of the instructions from the image of the file 110, adding to the emulation log 130 the corresponding records about the emulation of the execution of the known sets of instructions. In some aspects, in the process of emulating the execution of the instructions from the iamge of the file, the emulation module 120 may, in response to encountering an inserted break point, add a record to the emulation log indicating emulation of the execution of the known set of instructions, and emulate execution of an alternative set of instructions corresponding to the detected at least one known set of instructions (that is, refrain from emulating execution of the detected at least one known set of instructions). In some aspects, the alternative set of instructions may include an optimized set of instructions configured to have a same result of emulating execution and consume less resources than the known set of instructions. In some aspects, the alternative set of instructions corresponding to the anti-emulation instructions may be configured to have a same result of emulating execution and not impede emulation of execution of the file.

If in step 204 in the process of emulating the execution of the instructions from the image of the file 110 it becomes necessary to read the next portion 105 of the file 110, the emulation module 120 in step 205 reads the next portion 105 of the file 110, after which steps 202-205 (205 only if necessary) are repeated. The emulation module may halt (finish) the process of emulating the execution of the file 110 in step 206 (the halting may occur at the moment of performing any one of steps 202-205, the transition is indicated by broken lines), for example, upon lapsing of the established emulation time.

Figure 2B:
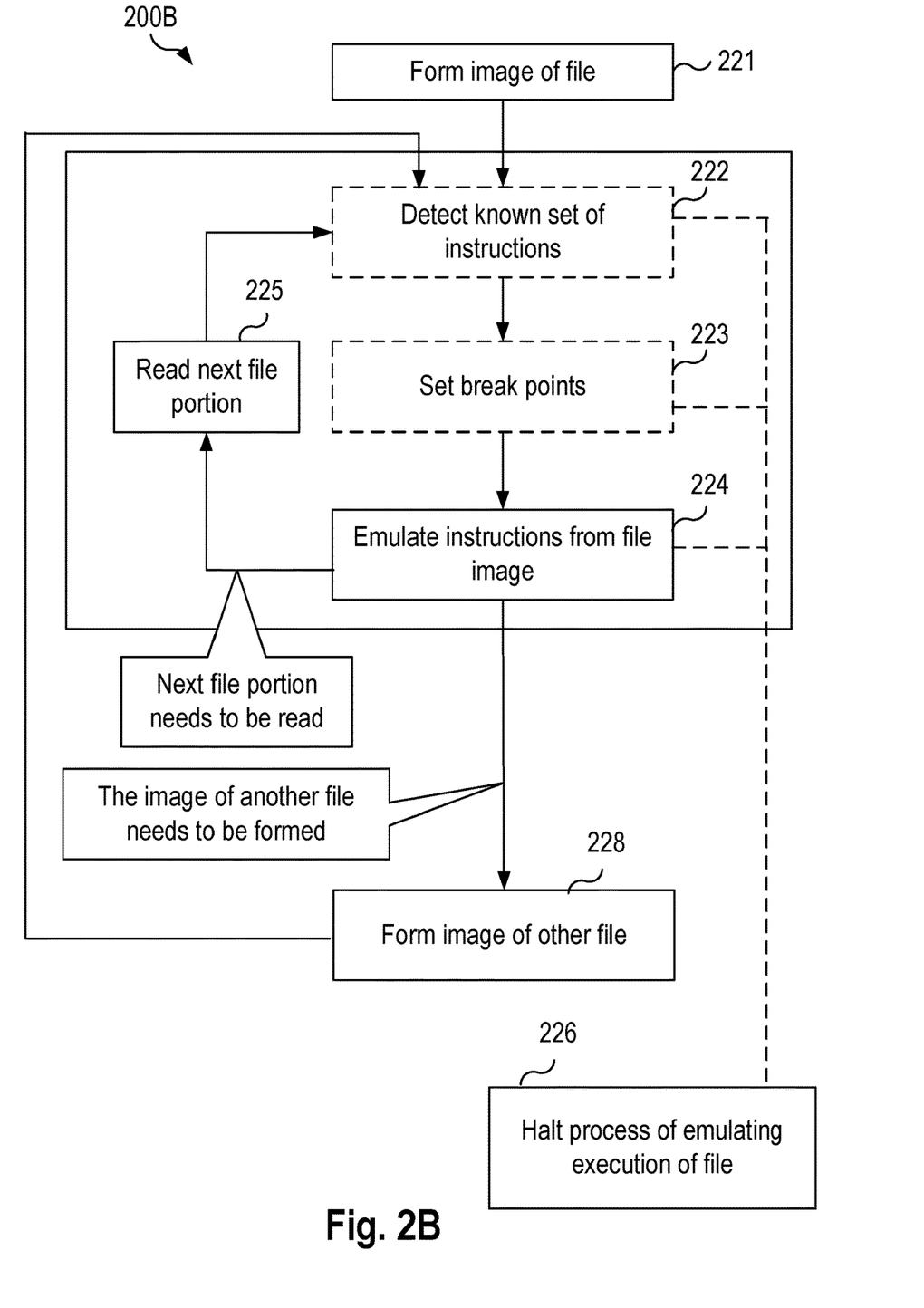
FIG. 2B is a flowchart illustrating another method for emulating the execution of files according to another exemplary aspect.

FIG. 2B is a flowchart illustrating a method 200B for emulating the execution of files according to another exemplary aspect. In step 221 the emulation module 120 forms the image of the file 110. This step also includes the reading of the portion 105 of the file 110. Next, in step 222, the analysis module 121 detects at least one known set of instructions in the portion 105 of the file 110 read by the emulation module 120. The detection may be done with the aid of signatures from a database 125 of known sets of instructions. In step 223, the analysis module 121 sets break points in the formed image of the file 110 at places corresponding to the starts of all the detected known sets of instructions from the read portion 105 of the file 110. After this, in step 224, the emulation module 120 performs the emulation of the execution of the instructions from the image of the file 110, adding to the emulation log 130 the corresponding records about the emulation of the execution of the known sets of instructions. If in step 224 in the process of emulating the execution of the instructions from the image of the file 110 it becomes necessary to read the next portion 105 of the file 110, the emulation module 120 in step 225 reads the next portion 105 of the file 110, after which steps 222-225 (225 only if necessary) are repeated.

If in the process of emulating the execution of instructions from the image of the file 110 it became necessary to perform an emulation of the execution of an instruction from the image of another file, the emulation module 120 forms the image of this other file in step 228. The step 228 of forming the image of the other file is similar to step 221. After this, the steps 222-225 are performed with regard to the other file. During the emulating of the execution of the instructions from the image of the other file it may likewise become necessary to emulate the execution of an instruction from the image of yet another file. In this case, steps 228, 222-225 are repeated by analogy with the scenario described above. The emulation module may halt (finish) the process of emulating the execution of the file 110 in step 226 (the halting may occur at the moment of performing any one of steps 222-225, the transition is indicated by broken lines), for example, upon lapsing of the established emulation time.

In one aspect, the need to emulate the execution of instructions from another file, and specifically from the image of another file, and accordingly the need to form an image of the other file, arises when the file 110 and accordingly the image of this file 110 contains instructions different from machine instructions, and it becomes necessary to emulate the execution of an instruction from the image of the other file which is an interpreter (library) file, and the emulating of the execution of the instructions from that image of a file is necessary for the interpreting of instructions different from machine instructions in the image of the file 110. For example, the image of the file 110 contains a CIL code, and during the emulating of the execution of the instructions from the image of the file 110 the emulation module 120 needs to perform an emulation of the calling of the function coreexemain, it becomes necessary to emulate the execution of the instructions of the other file image, in particular, the file image MSCoreEE.dll, and consequently control is transferred from the image of the file 110 to the execution environment .NET (the image of the file MSCoreEE.dll). When such a need arises, the emulation module 120 forms the image of the interpreter file, especially the file MSCoreEE.dll, and begins the emulation of the execution of instructions from the image of this file, and during the emulating of the execution of the instructions of the function coreexemain from the image of the file MSCoreEE.dll there will be performed an emulation of the instructions which are designed for the interpreting (processing) of the CIL code from the image of the file 110. In another aspect, the known set of instructions is a set of instructions of the interpreter (library) file (MSCoreEE.dll), and accordingly also the instructions of the image of this file, which is designed for the processing (interpreting) of instructions (CIL code) different from the machine instructions contained in the image of the file 110.

In one aspect, steps 222 and 223 involving the file 110 are skipped, and accordingly during the emulation of the execution of the file 110 no records will be added to the emulation log 130 as to the emulating of the execution of the known set of instructions from the file 110, and only records on the emulating of the execution of the known sets of instructions from the image of the other file will be added, in particular the image formed in step 228.

Figure 3:
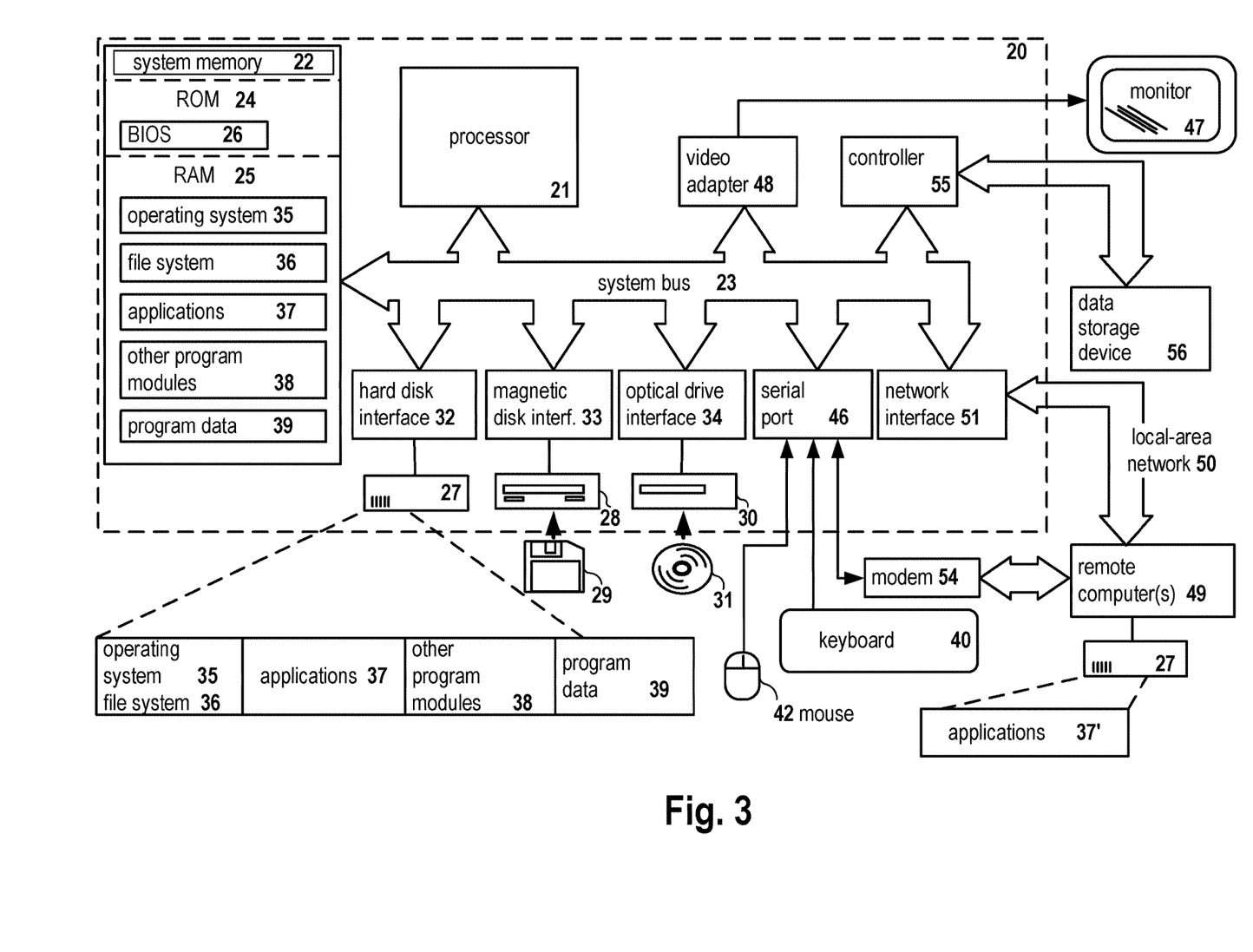
FIG. 3 is a block diagram of a general-purpose computer system on which the disclosed system and method can be implemented according to an exemplary aspect

FIG. 3 is a block diagram illustrating a general-purpose computer system 20 on which aspects of systems and methods for emulating an execution of a file based on emulation time may be implemented in accordance with an exemplary aspect. It should be noted that the computer system 20 can correspond to the system 100, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for emulating execution of files based on emulation time, the method comprising:
generating an image of a file;
emulating an execution of instructions from the image of the file for a predetermined emulation time, wherein the emulation includes:
when an emulation of an execution of instruction from an image of another file is needed, generating an image of the another file;
detecting at least one known set of instructions in a portion read from the image of the another file;
inserting a break point into a position in the generated image of the another file corresponding to a start of the detected at least one known set of instructions from the image of the another file;
emulating execution of the another file by emulating execution of instructions from the generated image of the another file, and adding corresponding records to an emulation log associated with the emulated execution of the at least one known set of instructions from the image of the another file; and
reading a next portion from the image of the another file and repeating the emulation of the execution of instructions until the predetermined emulation time has elapsed.

2. The method of claim 1, wherein the generating of the image further comprises reading a portion of the image of the file, and the method further comprises:
detecting at least one known set of instructions in the read portion of the image of the file; and
inserting break points in the generated image of the image of the file, each break point corresponding to a respective detected known set of instructions.

3. The method of claim 2, further comprising:
emulating an execution of the at least one known set of instructions from the image of the file; and
adding, to the emulation log, records corresponding to the emulation of the execution of the at least one known set of instructions from the image of the file.

4. The method of claim 1, wherein the image of the file is generated by imitating functions of a loader of an operating system of a computing device.

5. The method of claim 1, wherein the image of the file includes at least one of: instructions of program code contained in the file, service information on entry points of the program code, a content of an import address table, and locations of sections of the file.

6. The method of claim 5, wherein the service information on entry points of the program code, the content of the import address table, and the locations of sections of the file are obtained from a header of the file.

7. The method of claim 1, wherein a size of the portion read from the image is selected from: 4 kb, and a size equal to a size of a cluster on a data storage device.

8. A system for emulating an execution of a file based on emulation time, the system comprising:
a storage device configured to store a file, an image of a file, and an emulation log; and
a hardware processor configured to:
when an emulation of an execution of instruction from an image of another file is needed, generate an image of the another file;
detect at least one known set of instructions in a portion read from the image of the another file;
insert a break point into a position in the generated image of the another file corresponding to a start of the detected at least one known set of instructions from the image of the another file;
emulate execution of the another file by emulating execution of instructions from the generated image of the another file, and add corresponding records to an emulation log associated with the emulated execution of the at least one known set of instructions from the image of the another file; and
read a next portion from the image of the another file and repeat the emulation of the execution of instructions until the predetermined emulation time has elapsed.

9. The system of claim 8, wherein the configuration for generating of the image further comprises configurations for reading a portion of the image of the file, and the processor further being configured to:
detect at least one known set of instructions in the read portion of the image of the file; and
insert break points in the generated image of the image of the file, each break point corresponding to a respective detected known set of instructions.

10. The system of claim 9, the processor being further configured to:
emulate an execution of the at least one known set of instructions from the image of the file; and
add, to the emulation log, records corresponding to the emulation of the execution of the at least one known set of instructions from the image of the file.

11. The system of claim 8, wherein the image of the file is generated by imitating functions of a loader of an operating system of a computing device.

12. The system of claim 8, wherein the image of the file includes at least one of: instructions of program code contained in the file, service information on entry points of the program code, a content of an import address table, and locations of sections of the file.

13. The system of claim 12, wherein the service information on entry points of the program code, the content of the import address table, and the locations of sections of the file are obtained from a header of the file.

14. The system of claim 8, wherein a size of the portion read from the image is selected from: 4 kb, and a size equal to a size of a cluster on a data storage device.

15. A non-transitory computer readable medium comprising computer executable instructions for emulating an execution of a file based on emulation time, including instructions for:
generating an image of a file;
emulating an execution of instructions from the image of the file for a predetermined emulation time, wherein the instructions for emulation include instructions for:
when an emulation of an execution of instruction from an image of another file is needed, generating an image of the another file;
detecting at least one known set of instructions in a portion read from the image of the another file;
inserting a break point into a position in the generated image of the another file corresponding to a start of the detected at least one known set of instructions from the image of the another file;
emulating execution of the another file by emulating execution of instructions from the generated image of the another file, and adding corresponding records to an emulation log associated with the emulated execution of the at least one known set of instructions from the image of the another file; and reading a next portion from the image of the another file and repeating the emulation of the execution of instructions until the predetermined emulation time has elapsed.

16. The computer readable medium of claim 15, wherein the instructions for generating of the image further comprise instructions for reading a portion of the image of the file, and wherein the instructions further include instructions for:
   detecting at least one known set of instructions in the read portion of the image of the file; and
   inserting break points in the generated image of the image of the file, each break point corresponding to a respective detected known set of instructions.

17. The computer readable medium of claim 16, wherein the instructions further include instructions for:
   emulating an execution of the at least one known set of instructions from the image of the file; and
   adding, to the emulation log, records corresponding to the emulation of the execution of the at least one known set of instructions from the image of the file.

18. The computer readable medium of claim 15, wherein the image of the file is generated by imitating functions of a loader of an operating system of a computing device.

19. The computer readable medium of claim 15, wherein the image of the file includes at least one of: instructions of program code contained in the file, service information on entry points of the program code, a content of an import address table, and locations of sections of the file.

20. The computer readable medium of claim 19, wherein the service information on entry points of the program code, the content of the import address table, and the locations of sections of the file are obtained from a header of the file.

21. The computer readable medium of claim 15, wherein a size of the portion read from the image is selected from: 4 kb, and a size equal to a size of a cluster on a data storage device.

* * * * *